United States Patent
Tang et al.

(10) Patent No.: US 7,228,113 B1
(45) Date of Patent: Jun. 5, 2007

(54) SIMO/MISO TRANSCEIVER FOR PROVIDING PACKET DATA COMMUNICATION WITH SISO TRANSCEIVER

(75) Inventors: Haiyun Tang, Saratoga, CA (US); Hamid Aghajan, Palo Alto, CA (US); Karim Toussi, Belmont, CA (US); Ahmad Bahai, Lafayette, CA (US)

(73) Assignee: National Semiconductor Corporation, Sunnyvale, CA (US)

( * ) Notice: Subject to any disclaimer, the term of this patent is extended or adjusted under 35 U.S.C. 154(b) by 612 days.

(21) Appl. No.: 10/818,151

(22) Filed: Apr. 5, 2004

(51) Int. Cl.
*H04B 1/02* (2006.01)
*H04B 17/00* (2006.01)
*H04B 1/10* (2006.01)

(52) U.S. Cl. ............... 455/101; 455/67.11; 455/115.1; 370/334; 370/339

(58) Field of Classification Search ............. 455/101, 455/67.11, 115.1, 296, 95, 114.2, 277.2, 278.1, 455/334; 370/334, 335, 336, 339, 360

See application file for complete search history.

(56) References Cited

U.S. PATENT DOCUMENTS

| 6,185,258 B1 | 2/2001 | Alamouti et al. |
| 6,314,147 B1 * | 11/2001 | Liang et al. ................. 375/346 |
| 7,155,177 B2 * | 12/2006 | Jootar et al. ................. 455/101 |
| 2003/0125040 A1 * | 7/2003 | Walton et al. ............... 455/454 |
| 2005/0075081 A1 * | 4/2005 | Catreux-Erceg et al. ...... 455/78 |

OTHER PUBLICATIONS

U.S. Appl. No. 10/818,061, filed Apr. 5, 2004, Tang et al.
U.S. Appl. No. 10/818,147, filed Apr. 5, 2004, Tang et al.

* cited by examiner

*Primary Examiner*—Tony T. Nguyen
(74) *Attorney, Agent, or Firm*—Vedder, Price, Kaufman & Kammholz, P.C.

(57) ABSTRACT

Apparatus and method for providing for packet data communication between a single-input-single-output (SISO) transceiver and a single-input-multiple-output/multiple-input-single-output (SIMO/MISO) transceiver. Receive channel coefficients representing relative strengths of individual signals received via multiple spatially diverse antenna elements and corresponding to a wireless data signal originating from a particular SISO radio frequency (RF) transceiver are used to provide substantially complementary transmit channel coefficients for use in producing outgoing RF signals to be transmitted via the same antenna elements for reception by such particular SISO RF transceiver.

18 Claims, 9 Drawing Sheets

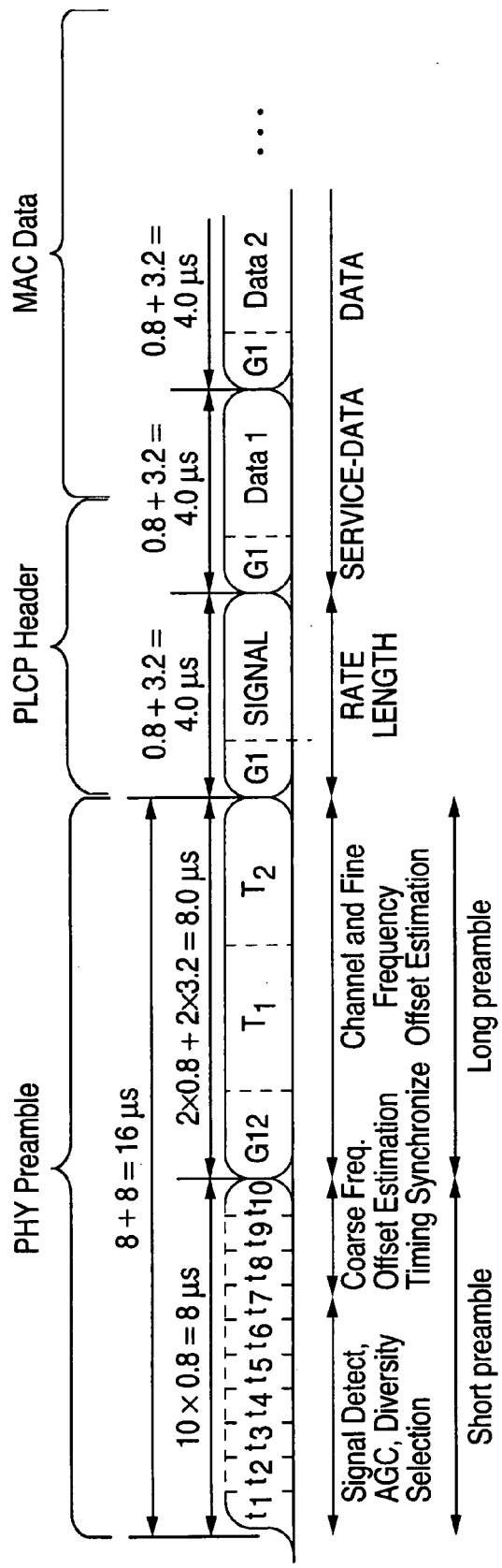

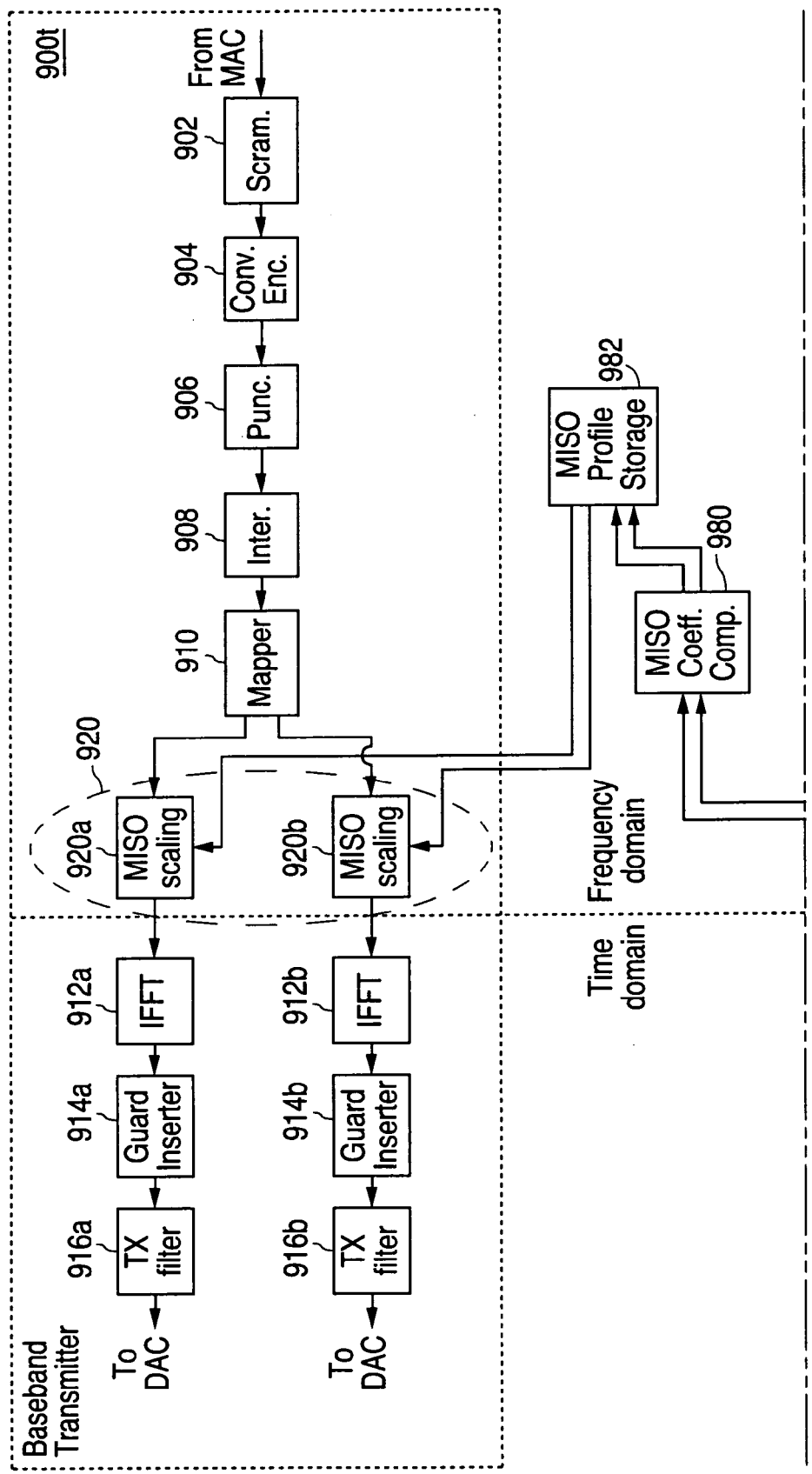

SIMO/MISO TRANSCEIVER FOR PROVIDING PACKET DATA COMMUNICATION WITH SISO TRANSCEIVER

BACKGROUND OF THE INVENTION

1. Field of the Invention

The present invention relates to a method and apparatus to improve performance of a packet data communications system using orthogonal frequency division multiplexing (OFDM) with multiple transmit/receive RF front-ends and antennas. More specifically, it relates to system architecture and algorithm that use multiple RF front-ends and antennas to achieve transmit/receive diversity and thus improve system performance in packet OFDM systems such as IEEE 802.11a and IEEE 802.11g systems.

2. Description of the Related Art

The wireless local area network (WLAN) based on packet OFDM technology has experienced significant growth in recent years. A typical such system is an IEEE 802.11a/g system.

In an IEEE 802.11 WLAN, multiple WLAN stations communicating between each other in a confined environment form an ad-hoc wireless network called Basic Service Set (BSS). A BSS can optionally contain an Access Point (AP) which usually acts as a bridge between the wireless LAN BSS and a wired local area network. Without the presence of an AP, the BSS operates in the ad-hoc mode where each wireless station abides the CSMA/CA (Carrier Sense Medium Access/Collision Avoidance) medium access protocol, i.e., it ensures that the medium is idle before transmitting. With the presence of an AP, the BSS operates in infrastructure mode where the AP coordinates the medium traffic on top of the basic CSMA/CA medium access protocol used by individual stations.

In a packet system like an IEEE 802.11 WLAN, a unit of transmission is a packet. Although the packet size may vary, the packet structure is usually fixed as shown in FIG. 1. The first portion of the packet is the physical layer preamble (PHY Preamble). The PHY Preamble usually contains a known signal pattern that is used by the receiver for packet detection and parameter estimation (i.e., channel, carrier frequency, etc.). The second portion of the packet is the PLCP (Physical Layer Convergence Procedure) Header. The PLCP Header contains information to configure the receiver for the reception of the subsequent data portion of the packet. Such information includes, for example, data rate (IEEE 802.11a/g supports 8 data rates ranging from 6 Mbps to 54 Mbps), packet data length, etc. The last portion of the packet is the MAC (Medium Access Control) Data. The data portion of the packet could vary in length which results in variable packet length.

FIG. 2 shows the IEEE 802.11a packet structure and its corresponding PHY Preamble, PLCP Header, and MAC Data sections. The same packet structure is also used for the OFDM mode of IEEE 802.11g. The PHY Preamble section of the packet is 16$s$ long and consists of 10 short preambles and 2 long preambles. The short preambles are typically used for signal detection, AGC (Automatic Gain Control), coarse frequency offset estimation, and possibly timing synchronization. The long preambles are typically used for fine frequency offset estimation and channel estimation. The first OFDM symbol after the long preambles contains the SIGNAL field of the PLCP Header, which encodes the packet length and modulation type information. Once the SIGNAL field is correctly decoded, the receiver will properly configure the baseband signal processing path to receive the MAC Data section of the packet.

Wireless communication system performance depends heavily on the radio propagation environment. FIG. 3 shows a simplified two-dimensional radio propagation environment. Radio signal obstacles are represented as one-dimensional walls with certain transmission and reflection coefficients. The graph has one transmitter and one receiver marked as circles. The radio signal propagation environment between the transmitter and receiver is called a channel. Due to wall transmissions and reflections, multiple replicas of the original signal transmitted by the transmitter are received. The replicas have different amplitudes and arrival times as shown in the impulse response graph in FIG. 4 and the corresponding channel frequency response is shown in FIG. 5 (the Y-axis is in a logarithmic scale).

The curve in FIG. 5 has a significant dip in the middle which is almost 20 dB deep. Such behavior is called frequency selective multipath fading and is typical in multipath channels. In an OFDM system, data is modulated on narrowband subcarriers. For example, IEEE 802.11a/g uses 64 narrowband subcarriers over a 20 MHz range. Because of multipath fading, each subcarrier experiences a different channel frequency response (In FIG. 5, the channel frequency response on each subcarrier is represented as a circle). The subcarriers around the dip would experience very low channel gains resulting in data loss on those subcarriers.

There are different ways to mitigate the effect of multipath fading. One way is through frequency diversity where the data is spread across multiple carriers so that the deep fades on some of subcarriers can be offset by gains on other subcarriers. Another method uses spatial diversity to mitigate multipath fading. In this latter method, the transceiver uses multiple antennas (in the form of an antenna array) and RF front-ends and combines the signals from different antenna branches to mitigate multipath fading.

In FIG. 6, the channel frequency responses on four different antennas that are spaced one carrier wavelength apart (about 6 cm for 5.25 GHz carrier) are plotted. The channel frequency responses are different on the four antennas. Often times when there is a dip on one of the channel frequency response curves, there is peak on another curve. Transmit and receive spatial diversity algorithm can be used to combine the signals on the four antennas so that deep fades on some of the channels can be offset by high gains on other channels resulting in a combined channel frequency response (shown as the top curve in FIG. 6) that is superior than any individual channel frequency responses. It should be noted that aside from mitigating multipath fading, combining signals from different RF branches has intrinsic combining gain depending upon the number of RF branches used (assuming noises are not correlated across RF branches).

SUMMARY OF THE INVENTION

In accordance with the presently claimed invention, an apparatus and method provide for packet data communication between a single-input-single-output (SISO) transceiver and a single-input-multiple-output/multiple-input-single-output (SIMO/MISO) transceiver. Receive channel coefficients representing relative strengths of individual signals received via multiple spatially diverse antenna elements and corresponding to a wireless data signal originating from a particular SISO radio frequency (RF) transceiver are used to provide substantially complementary transmit channel coefficients for use in producing outgoing RF signals to be transmitted via the same antenna elements for reception by such particular SISO RF transceiver.

In accordance with one embodiment of the presently claimed invention, a single-input-multiple-output/multiple-input-single-output (SIMO/MISO) transceiver for providing packet data communication with a single-input-single-output (SISO) transceiver includes a plurality of signal terminals, receiver circuitry, channel estimation circuitry, channel profile circuitry, scaling circuitry and transmitter circuitry. The plurality of signal terminals is for conveying a plurality of incoming radio frequency (RF) signals received via at least a portion of a plurality of spatially diverse antenna elements and corresponding to a wireless data signal originating from a particular SISO RF transceiver, and for conveying a plurality of outgoing RF signals to be transmitted via at least another portion of the plurality of spatially diverse antenna elements for reception by the particular SISO RF transceiver. The receiver circuitry is coupled to at least a portion of the plurality of signal terminals and responsive to the plurality of incoming RF signals by providing a corresponding plurality of incoming data signals. The channel estimation circuitry is coupled to the receiver circuitry and responsive to the plurality of incoming data signals by providing a plurality of receiver channel gain coefficients, wherein each one of the plurality of receiver channel gain coefficients corresponds to a relative signal strength of a respective one of the plurality of incoming RF signals. The channel profile circuitry is coupled to the channel estimation circuitry and responsive to the plurality of receiver channel gain coefficients by providing a related plurality of transmitter channel gain coefficients, wherein each one of the plurality of transmitter channel gain coefficients corresponds to a normalized inverse of a respective one of the plurality of receiver channel gain coefficients. The scaling circuitry is coupled to the channel profile circuitry and responsive to the plurality of transmitter channel gain coefficients by scaling one or more outgoing data signals to provide a plurality of related digital data signals. The transmitter circuitry is coupled to the scaling circuitry and at least another portion of the plurality of signal terminals, and responsive to the plurality of related digital data signals by providing the plurality of outgoing RF signals.

In accordance with another embodiment of the presently claimed invention, a single-input-multiple-output/multiple-input-single-output (SIMO/MISO) transceiver for providing packet data communication with a single-input-single-output (SISO) transceiver includes signal means, receiver means, channel estimator means, channel profiler means, scaling means and transmitter means. The signal means is for conveying a plurality of incoming radio frequency (RF) signals received via at least a portion of a plurality of spatially diverse antenna elements and corresponding to a wireless data signal originating from a particular SISO RF transceiver, and for conveying a plurality of outgoing RF signals to be transmitted via at least another portion of the plurality of spatially diverse antenna elements for reception by the particular SISO RF transceiver. The receiver means is for receiving the plurality of incoming RF signals and in response thereto generating a corresponding plurality of incoming data signals. The channel estimator means is for receiving the plurality of incoming data signals and in response thereto generating a plurality of receiver channel gain coefficients, wherein each one of the plurality of receiver channel gain coefficients corresponds to a relative signal strength of a respective one of the plurality of incoming RF signals. The channel profiler means is for receiving the plurality of receiver channel gain coefficients and in response thereto generating a related plurality of transmitter channel gain coefficients, wherein each one of the plurality of transmitter channel gain coefficients corresponds to a normalized inverse of a respective one of the plurality of receiver channel gain coefficients. The scaling means is for receiving the plurality of transmitter channel gain coefficients and in response thereto scaling one or more outgoing data signals to provide a plurality of related digital data signals. The transmitter means is for receiving the plurality of related digital data signals and in response thereto generating the plurality of outgoing RF signals.

In accordance with still another embodiment of the presently claimed invention, a method for providing packet data communication between a single-input-single-output (SISO) transceiver and a single-input-multiple-output/multiple-input-single-output (SIMO/MISO) transceiver includes:

conveying a plurality of incoming radio frequency (RF) signals received via at least a portion of a plurality of spatially diverse antenna elements and corresponding to a wireless data signal originating from a particular SISO RF transceiver;

responding to the plurality of incoming RF signals by generating a corresponding plurality of incoming data signals;

responding to the plurality of incoming data signals by generating a plurality of receiver channel gain coefficients, wherein each one of the plurality of receiver channel gain coefficients corresponds to a relative signal strength of a respective one of the plurality of incoming RF signals;

responding to the plurality of receiver channel gain coefficients by generating a related plurality of transmitter channel gain coefficients, wherein each one of the plurality of transmitter channel gain coefficients corresponds to a normalized inverse of a respective one of the plurality of receiver channel gain coefficients;

responding to the plurality of transmitter channel gain coefficients by scaling one or more outgoing data signals to generate a plurality of related digital data signals; and responding to the plurality of related digital data signals by generating a plurality of outgoing RF signals for transmission via at least another portion of the plurality of spatially diverse antenna elements and reception by the particular SISO RF transceiver.

BRIEF DESCRIPTION OF THE DRAWINGS

FIG. 1 shows a general wireless LAN packet structure.

FIG. 2 shows detailed PHY-layer packet structure for IEEE 802.11a/g.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 7:
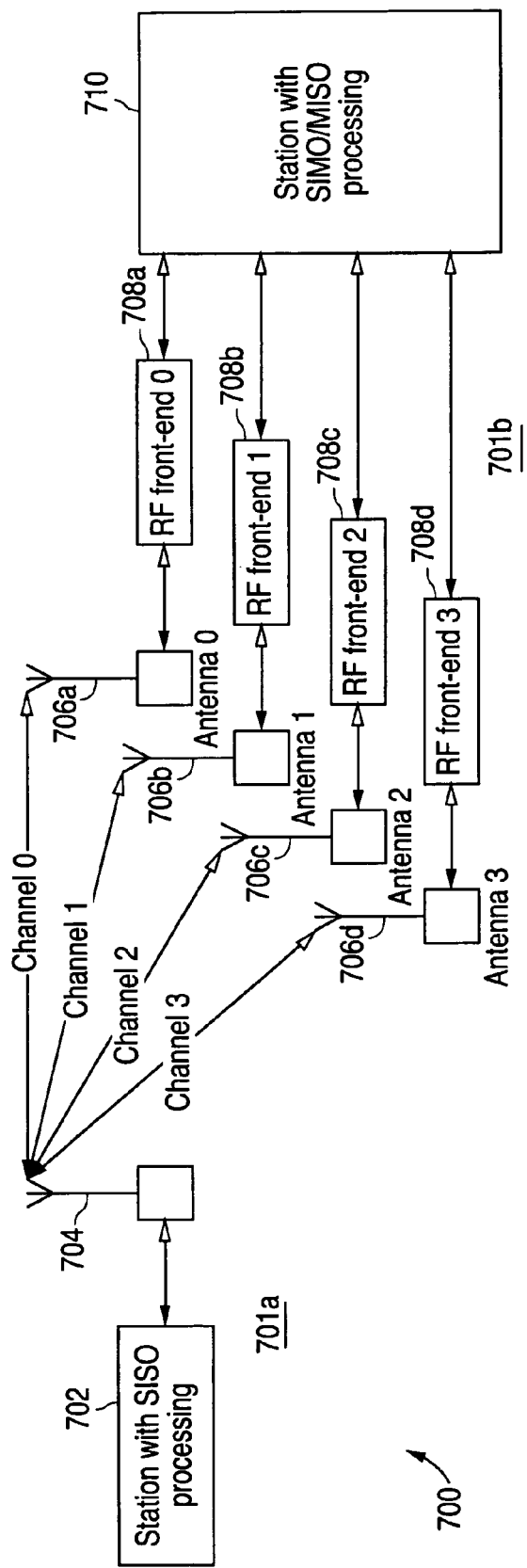
FIG. 7 shows the proposed SIMO/MISO system architecture that contains a SISO station and a MISO station.

Referring to FIG. 7, the proposed SIMO/MISO architecture 700 consists of two entities: a regular wireless LAN mobile station 702 with SISO processing capability, and a wireless LAN mobile station 710 with SIMO/MISO processing capability. Although not necessary, the station 710 with SIMO/MISO capability is usually an AP because an AP usually does not have space constraints that will limit the number of mountable antennas, and also because an AP is usually not battery powered so that the higher power consumption due to SIMO/MISO processing is not an issue.

Figure 3:
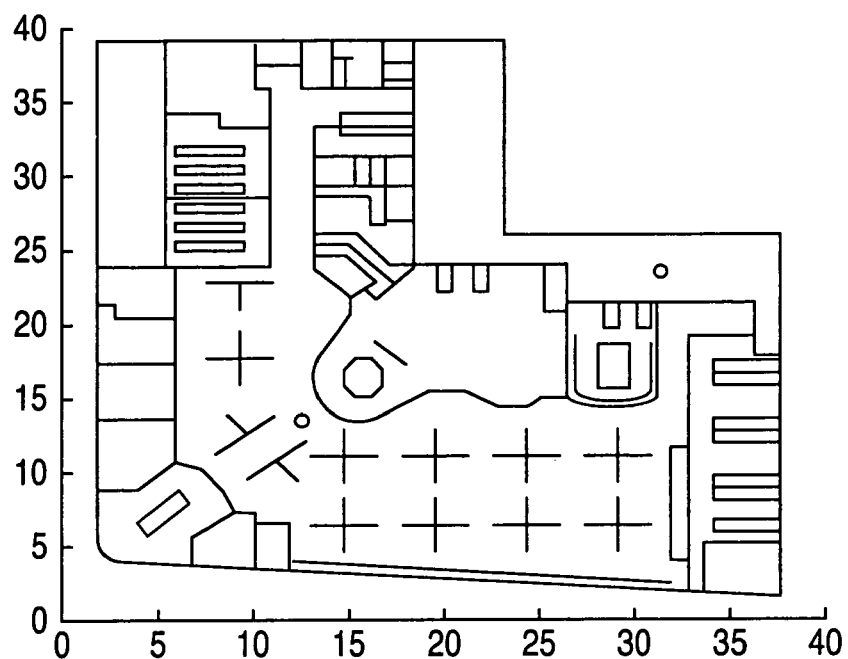
FIG. 3 shows an example two-dimensional radio propagation environment that is used by ray-tracing simulation to generate various multipath channel profile.
Figure 4:
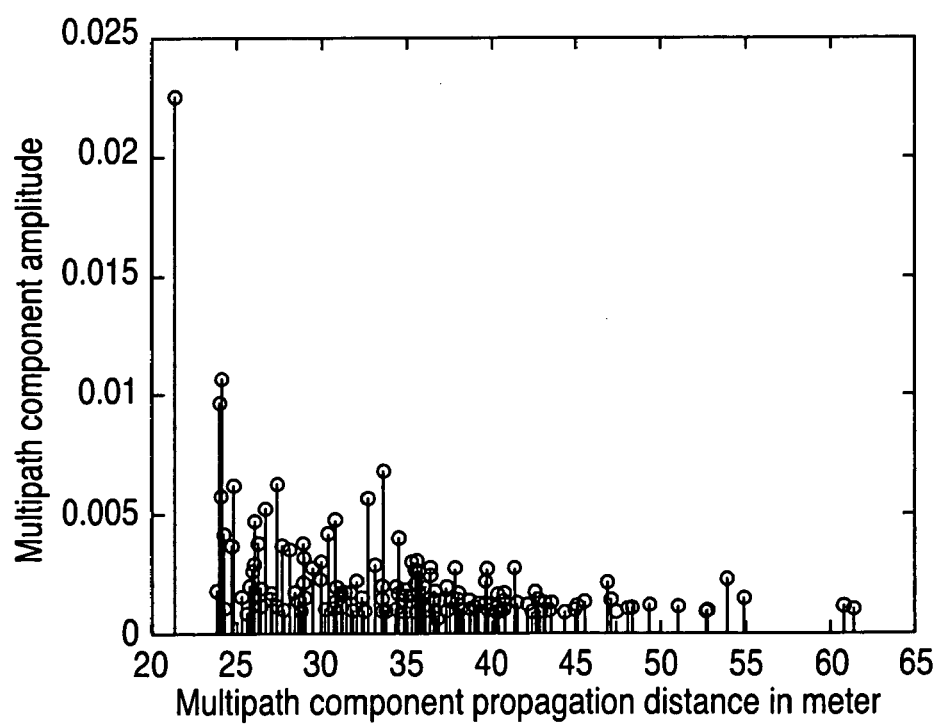
FIG. 4 shows the impulse response of a multipath channel generated from the radio propagation environment shown in FIG. 3.
Figure 5:
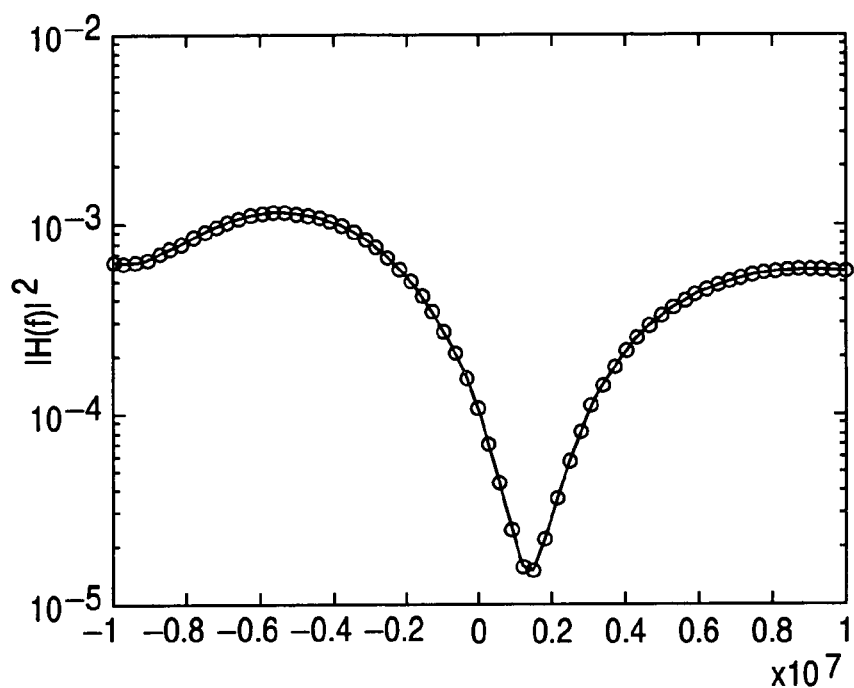
FIG. 5 shows the channel frequency response of the multipath channel shown in FIG. 4 over a 20 MHz span around 5.25 GHz.
Figure 6:
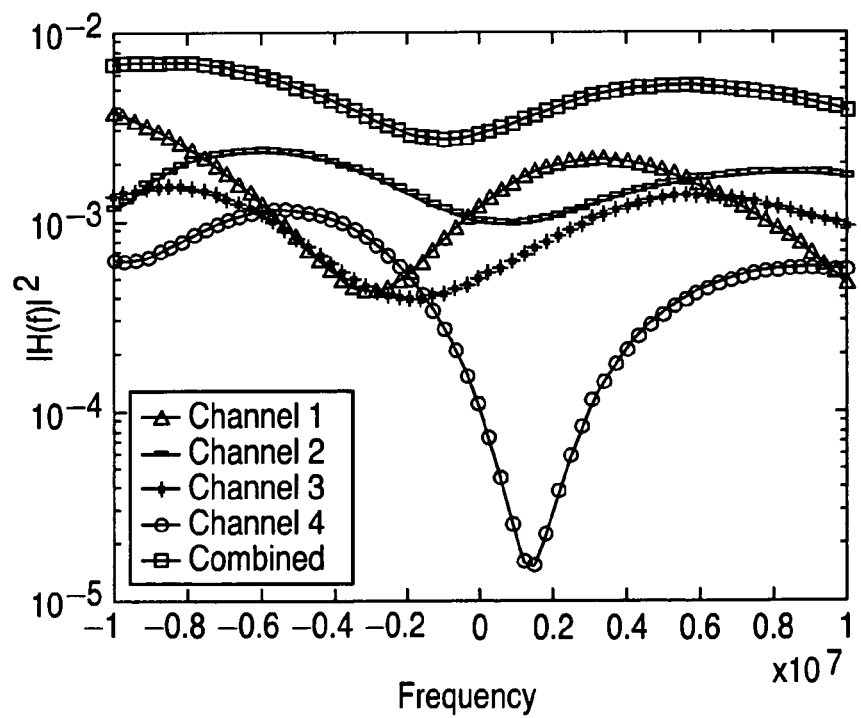
FIG. 6 shows the channel frequency responses on 4 antennas placed approximately 6 cm apart.

In a typical scenario, the SISO station 702 will send an uplink packet to the SIMO/MISO station 710. (In FIG. 7, the empty arrows indicate the direction of the uplink packet transfer, and the filled arrows indicate the direction of the downlink packet transfer.) During the reception of the packet, the SIMO/MISO station 710 will perform channel estimation, SIMO combining, and computation of the MISO gain coefficients. The SIMO combining increases the performance of the reception due to a higher combined channel gain as illustrated in FIG. 6. Upon successful reception of the packet, an association is established between the computed MISO gain coefficients and the particular SISO station 702 where the packet originated.

For a downlink packet transfer from the SIMO/MISO station 710 to the SISO station 702, the MISO gain coefficients associated with the SISO station 702 will be used to scale the baseband signals sent to the different RF front-ends 708 and antennas 706. Assuming the channels are reciprocal, the signals from the 4 channels will be combined over-the-air at the SISO station receiver resulting a higher combined channel gain (as illustrated in FIG. 6) and thus better performance for the reception.

Figure 8:
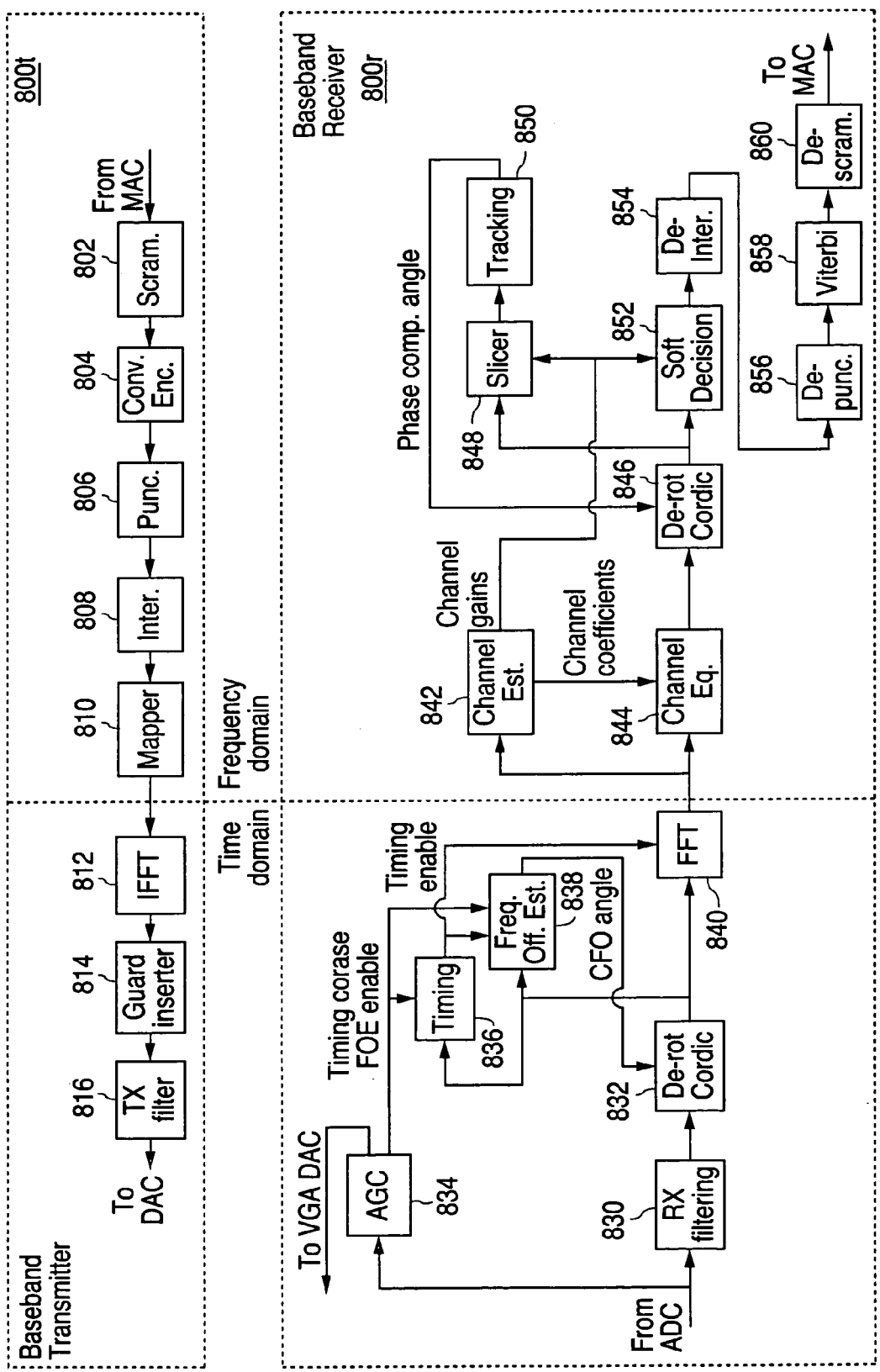
FIG. 8 shows a baseband block-level implementation of an IEEE 802.11a/g SISO transceiver.

FIG. 8 shows the block diagram of an IEEE 802.11a/g baseband SISO transceiver. For the transmit portion of the transceiver, the data from the MAC unit (not shown) are first randomized by a data Scrambler 802. The scrambled data then pass through a Convolution Encoder 804. The encoded data are first punctured (to allow for different data rates) by the Puncturer 806 and then interleaved by the Interleaver 808. The combined Convolution Encoder and Interleaver 808 is responsible for creating a channel code that exploits frequency-domain diversity. The Mapper 810 maps the interleaved data bits into constellation points. Four different types of constellations are supported including BPSK (binary phase shift keying), QPSK (quadrature phase shift keying), 16-QAM (16-level quadrature amplitude modulation), and 64-QAM (64-level quadrature amplitude modulation). Combining mapping with puncturing, a total of 8 different data rates ranging from 6 Mbps to 54 Mbps are supported by IEEE 802.11a/g.

In OFDM, constellation values are modulated in the frequency-domain (on narrowband subcarriers). To get the time-domain waveform, IFFT (inverse Fast Fourier Transformation) 812 is applied on the constellation values from the output of the Mapper 810. To mitigate the inter-symbol-interference due to multipath delay spread, a guard interval is inserted for each OFDM symbol by the Guard Inserter 814 and the OFDM symbol is cyclic extended in the guard interval. Certain transmitter filtering 816 may be performed to make sure the signal meets the transmitter spectrum mask requirement before sending it to the DAC (digital-analog-converter, not shown) whose output is up-converted to the carrier frequency by the analog front-end 708.

Refer to the lower portion of FIG. 8 for the receive baseband operations. The received signal is down-converted from carrier frequency to baseband by the analog RF front-end 708 and then sampled by the ADC (not shown) to generate the digitized baseband input.

The AGC 834 measures the energy of the received signal samples from the ADC (analog-digitial-converter) and adjusts the VGA (voltage gain amplifier) accordingly so that the average input signal energy has an appropriate level for detection. The AGC may also perform the carrier sense function—an integral part of the CSMA/CA protocol—based on the input signal energy level as well as other metrics, e.g., signal self-correlation. Upon carrier sense, the AGC enables the timing 836 and frequency offset estimation 838 modules.

The Timing module 836 finds the OFDM symbol boundary and packet start position. The timing module 836 operates on the preamble portion of an OFDM packet as shown in FIG. 2. The timing algorithm can use either the short preamble or the long preamble or both and is usually done by correlating the received signal samples with known preamble signal patterns and searching for a correlation peak.

The Frequency Offset Estimation module 838 estimates the carrier frequency offset between the transmitter and receiver. Frequency offset estimation is usually done in two steps. The first step is the coarse frequency offset estimation that uses the short preamble and starts upon carrier sense. The coarse estimation has less estimation accuracy but larger estimation range. The second step is fine frequency offset estimation that uses the long preamble and starts upon timing detection. The fine estimation has higher estimation accuracy but less estimation range. The combined coarse and fine frequency offset estimation will give an accurate estimation of the frequency offset. The estimation output from the Frequency Offset Estimation module 838 controls the De-rotation CORDIC (Coordinate Rotation Digital Computation) module 832 to correct the frequency offset on the input signal.

The AGC 834, Timing 836, and Frequency Offset Estimation 838 modules form a signal control path. On the other hand, as shown in FIG. 8, the main signal path starts with an optional Receive Filtering module 830 followed by a De-rotation CORDIC module 832 (controlled by the Frequency Offset Estimation module 838 for carrier frequency offset correction) and then by an FFT (Fast Fourier Transform) module 840 to transform the time domain signal to the frequency domain.

Once the signal is in the frequency domain, the data decoding phase starts. Due to frequency selective multipath fading, the signal on each narrow band subcarrier is multiplied by a complex channel gain coefficient which must be estimated and the signal needs to be equalized accordingly. The channel gain coefficient estimation is done by the Channel Estimation module 842. In most IEEE 802.11a/g implementations, the channel estimation is performed using only the long preambles assuming the channel does not vary for the duration of the packet. However in more advanced implementations, the channel estimation continues during the data section of the packet based on decision feedback techniques. In either case, the estimated complex channel gain coefficients are used by the channel equalization module 844 to equalize the input signals on the corresponding narrowband subcarriers.

Due to residual carrier frequency offset and phase noise, each OFDM symbol still has a phase drift which could accumulate into a large phase error which needs to be corrected for coherent detection. Referring to FIG. 8, the estimation and correction of the such phase drift is accomplished by the Slicer 848, Tracking 850, and De-rotation CORDIC 846 modules. The Slicer 848 regenerates the subcarrier signal constellation values based on hard decisions on the received subcarrier signals or the known pilot constellation values. The Tracking module 850 accumulates the phase difference between the received subcarrier signal values and the regenerated subcarrier signal values and produces a phase error estimation to control the CORDIC De-rotation module 846 to de-rotate the received subcarrier constellation values to correct the phase error.

Once the phase error is corrected, the subcarrier signal values are used by the Soft Decision module 852 to generate a bit metric for each bit carried on the subcarrier constellation. The optimal bit metric not only depends on the equalized subcarrier signal constellation value but also depends on the subcarrier channel gain (which is produced by the Channel Estimation module 842). The bit metrics will then be de-interleaved 854, de-punctured 856, and then passed to a Viterbi decoder 858 to decode the data bits. Finally, the decoded data bits will be de-scrambled 860 to reconstruct the original MAC data bits.

Before getting into the details of the SIMO/MISO implementation of the IEEE 802.11a/g system, we shall first formulate the mathematics of the OFDM SIMO/MISO operation. Referring to the system illustrated in FIG. 7, the transmitted signal from the SISO station is expressed as $$x(t) = \sum_{k=0}^{N-1} X(k) e^{j2\pi \frac{k}{T} t} \quad (1)$$

where N is the total number of subcarriers; X(k) is the constellation value carried on subcarrier k; and T is OFDM symbol period. After the channel, the received signal (by the SIMO/MISO station) on the i-th antenna branch is expressed as $$y_i(t) = \int_{-\infty}^{\infty} c_i(t-\tau) x(\tau) d\tau + z_i(t) \quad (2)$$

where $c_i(t)$ is the time-domain channel impulse response of the i-th antenna branch and $z_i(t)$ is the noise on the i-th antenna branch. Let the channel frequency response on k-th subcarrier and i-th antenna branch be $$C_i(k) = \int_{-\infty}^{\infty} c_i(t) e^{-j2\pi \frac{k}{T} i} dt \quad (3)$$

the received frequency-domain signal on k-th subcarrier and i-th antenna branch (after all the timing domain processing) is $$Y_i(k) = \frac{1}{T} \int_0^T y_i(t) e^{-j2\pi \frac{k}{T} i} dt = C_i(k) X(k) + Z_i(k) \quad (4)$$

where $$Z_i(k) = \frac{1}{T} \int_0^T z_i(t) e^{-j2\pi \frac{k}{T} i} dt \quad (5)$$

is the frequency-domain noise on subcarrier k and antenna branch i. The per subcarrier signals from all antenna branches are then $$\begin{aligned} Y_1(k) &= C_1(k) X(k) + Z_1(k) \\ Y_2(k) &= C_2(k) X(k) + Z_2(k) \\ &\vdots \\ Y_M(k) &= C_M(k) X(k) + Z_M(k) \end{aligned} \quad (6)$$

Here M is the total number of antenna branches. In the SIMO operation, the channel coefficients $C_i(k)$ are estimated for each subcarrier k and the received signals from different antenna branches are combined as $$Y(k) = \frac{C_1^*(k)Y_1(k) + C_2^*(k)Y_2(k) + \cdots + C_M^*(k)Y_M(k)}{\sqrt{|C_1(k)|^2 + |C_2(k)|^2 + \ldots + |C_M(k)|^2}} = C(k) \quad (7)$$

where the combined channel gain (over all antenna branches)

$$C(k) = \sqrt{|C_1(k)|^2 + |C_2(k)|^2 + \ldots + |C_M(k)|^2} \quad (8)$$

and the combined noise $$Z(k) = \frac{C_1^*(k)Z_1(k) + C_2^*(k)Z_2(k) + \cdots + C_M^*(k)Z_M(k)}{\sqrt{|C_1(k)|^2 + |C_2(k)|^2 + \ldots + |C_M(k)|^2}} \quad (9)$$

is white and has the same power as the per antenna branch noises (assuming they are uncorrelated and equal-power).

In the MISO operation, for each subcarrier and antenna branch, the complex MISO gain coefficient $$G_i(k) = \frac{C_i^*(k)}{\sqrt{|C_1(k)|^2 + |C_2(k)|^2 + \ldots + |C_M(k)|^2}} \quad (10)$$

is computed. During transmission, the MISO gain coefficients will be used to scale frequency domain data, i.e.

$$X_i(k) = G_i(k)X(k) \quad (11)$$

The transmitted time-domain signal on the i-th antenna branch is then $$x_i(t) = \sum_{k=0}^{N-1} X_i(k)e^{j2\pi\frac{k}{T}i} = \sum_{k=0}^{N-1} G_i(k)X(k)e^{j2\pi\frac{k}{T}i} \quad (12)$$

Referring to FIG. 7, assuming the channels are reciprocal, the received signal at the SISO station from the SIMO/MISO station is $$y(t) = \sum_{i=1}^{M} \int_{-\infty}^{\infty} c_i(t-\tau)x_i(\tau)d\tau + z(t) \quad (13)$$

At the SISO station receiver, after timing-domain processing, the frequency-domain received signal on each subcarrier is then $$Y(k) = \frac{1}{T}\int_{-\infty}^{\infty} y(t)e^{-j2\pi\frac{k}{T}i}dt = C(k)X(k) + Z(k) \quad (14)$$

Here $$C(k) = \sum_{i=1}^{M} C_i(k)G_i(k) \quad (15)$$

Given channel reciprocity between the SISO station and SIMO/MISO station, we have the channel gain $$C(k) = \sqrt{|C_1(k)|^2 + |C_2(k)|^2 + \ldots + |C_M(k)|^2} \quad (16)$$

the same as that of the SIMO case in Equation 8.

In both the SIMO and MISO cases, the SNR gain over the SISO case is $$\gamma_{SNR}(k) = \frac{|C_1(k)|^2 + |C_2(k)|^2 + \ldots + |C_M(k)|^2}{|C_i(k)|^2} \quad (17)$$

on subcarrier k comparing to a particular SISO antenna branch i. For frequency-flat fading channel, all channel frequency responses are the same and the gain is M, i.e., the total number of antenna branches. For a 4-antenna SIMO/MISO system, this combining gain is 6 dB. For frequency-selective fading channels, assuming the channels are uncorrelated, the average gain will be higher than the simple combining gain. Depending on the actual channels, the gain usually reaches 10 dB. The extra gain on top of the 6 dB combining gain is called diversity gain and is due to the diversity combing of the uncorrelated fading channels (as shown in FIG. 6).

Figure 9B:
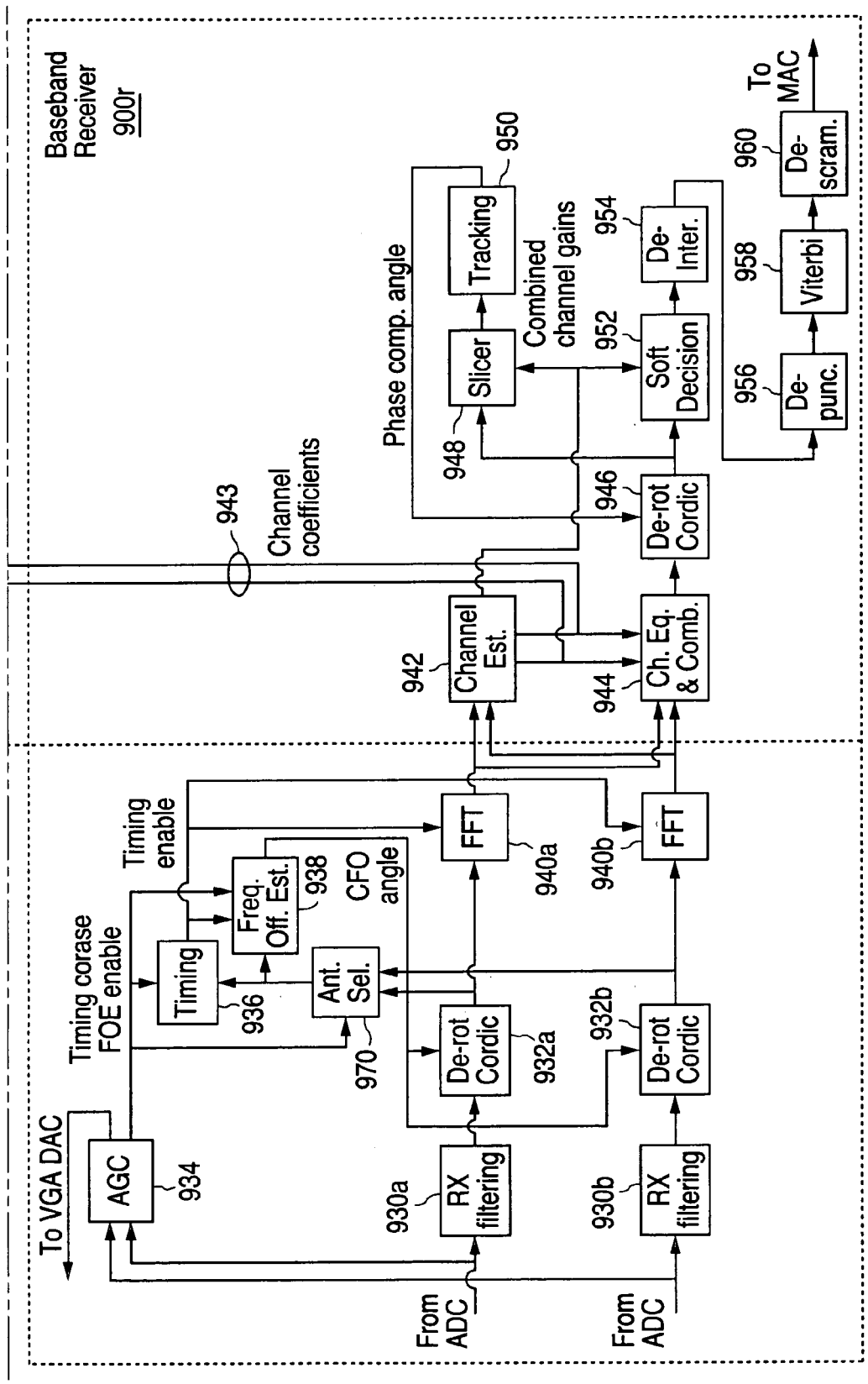
FIG. 9 shows a baseband block-level implementation of a SIMO/MISO IEEE 802.11a/g transceiver in accordance with one embodiment of the presently claimed invention.

The baseband block diagram for the proposed IEEE 802.11a/g SIMO/MISO transceiver is shown in FIG. 9. For simplicity of illustration, only two antenna branches are used in the SIMO/MISO system in FIG. 9. The extension to more antenna branches is straightforward.

The baseband time-domain processing shown in FIG. 9 is similar to the SISO time-domain processing. The exception is that now the AGC adjusts the gain based on the signal energies within all of the antenna branches. The gain adjustment is usually based on the maximum measured energy among all antenna branches. Another change is the addition of the Antenna Selection module 970 which selects one of the antenna branches 706 (FIG. 7) for timing and frequency offset estimation. The selection could be fixed to a particular antenna or it could be dynamic based on certain antenna selection metrics, e.g., maximum energy.

Once the signals from all antenna branches 706 reach the frequency domain after all the time-domain processing, the SIMO/MISO Channel Estimation module 942 estimates the channel coefficient on each subcarrier and each antenna branch, i.e., $C_i(k)$, using either the preamble or the decision feedback data values. For SIMO operation, the Channel Estimation module 942 also outputs the combined channel gain (Equation 8), which is used by the Soft Decision module 952 to generate bit metrics. The Channel Equalizer and Combiner 944 combines the signals according to Equation 7. Referring to FIG. 9, for SIMO operation, the combining happens in Channel Estimation 942 and Channel Equalizer and Combiner 944 modules only. The rest of the modules are similar to those of the SISO case.

Figure 13:
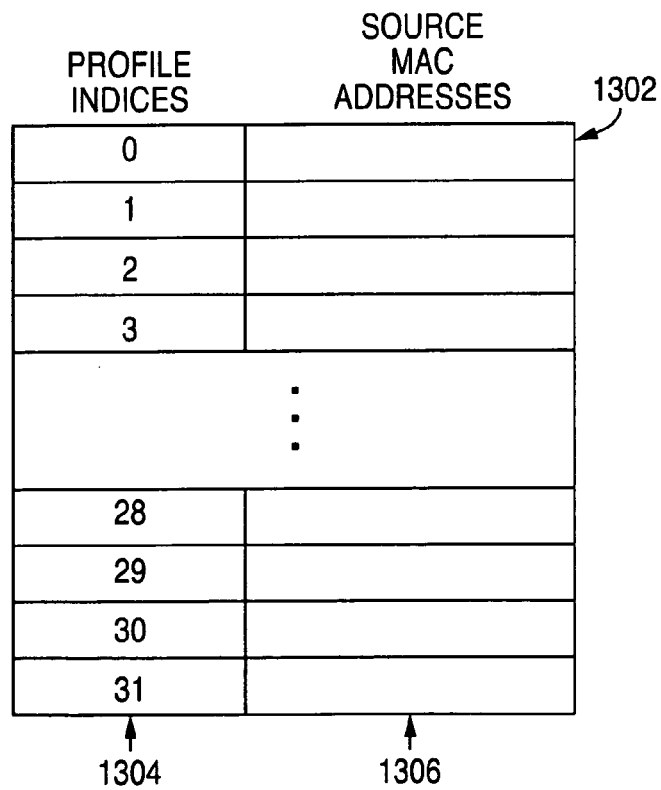
FIG. 13 depicts associations between MISO profile indices and SISO station MAC addresses.

For MISO operation, the MISO Coefficient Computation module 980 takes the estimated channel coefficients 943a from the Channel Estimation module 942 and generates the MISO gain coefficients according to Equation 10. Those MISO gain coefficients will be stored in a MISO profile storage module 982 and associated with the particular SISO station 702 that originates the uplink transmission to the SIMO/MISO station 710. For example, referring to FIG. 13, the MISO profile storage module 982 will keep a bank of profiles, which are indexed, e.g., from 0 through 31. An association table 1302 is maintained to associate a profile index 1304 with a MAC address 1306. Unused indices are associated with a NULL MAC address. Before a packet reception, an unused profile index is passed to the PHY 900r (the baseband blocks as implemented in FIG. 9). If the packet reception is a success (as indicated by a MAC CRC pass), the profile index is associated with the packet source station 702 MAC address. For each transmission, the MISO profile association table 1302 is checked for the destination MAC address. If there is a valid profile associated with the destination MAC address, the profile will be used to scale the frequency domain data (as performed by the MISO Scaling module 920 in FIG. 9). When there is no valid profile associated with the destination MAC address, a default profile may be used, e.g., to enable one of the 4 antenna branches. A new profile from a source station 702 overwrites the profile already associated with the station MAC address 1306 in the association table 1302.

Due to memory constraints, only a limited number of profiles may be stored in the MISO profile storage module 982. The association table 1302 is cleaned up periodically to ensure there are empty profiles for use by the PHY 900r for the next packet reception. Certain metrics may be used by the software to determine which user profiles to keep or delete upon an overflow, e.g., according to frequencies of use of specific MAC addresses.

When there is a packet transmission from the SIMO/MISO station 710 to the SISO station 702, the MISO gain coefficients associated with the SISO station 702 will be used to scale the Mapper 910 output according to Equation 11. This scaling is performed by the MISO Scaling modules 920 for the different antenna branches 706. The scaled signals sent on different antenna branches 706 will result in a combined signal at the SISO station that has the channel gain expressed in Equation 8. A more detailed description of a preferred embodiment of this operation can be found in commonly assigned, copending U.S. patent application Ser. No. 10/818,147, filed on even date herewith, and entitled "Apparatus For Generating Signal Gain Coefficients For a SIMO/MISO Transceiver For Providing Packet Data Communication With A SISO Transceiver" (the contents of which are incorporated herein by reference).

Figure 10:
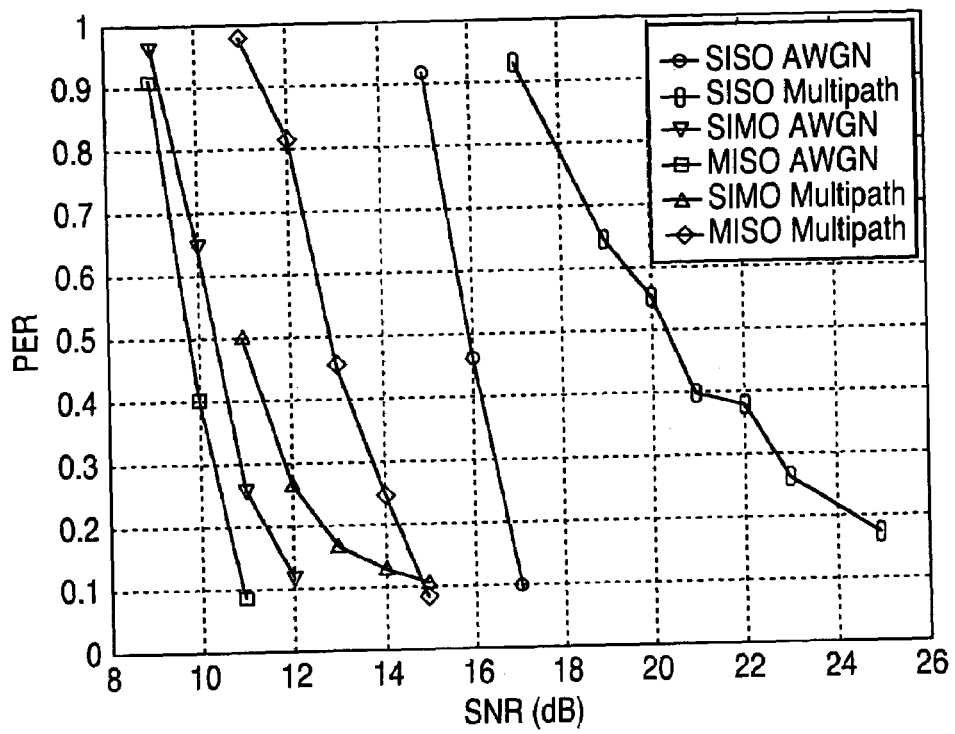
FIG. 10 shows a simulated pulse error rate (PER) performance comparison between a 4-antenna SIMO/MISO and a SISO for an IEEE 802.11a/g 64QAM, rate 3/4, 54 Mbps mode averaged over 400 400-byte packets.
Figure 11:
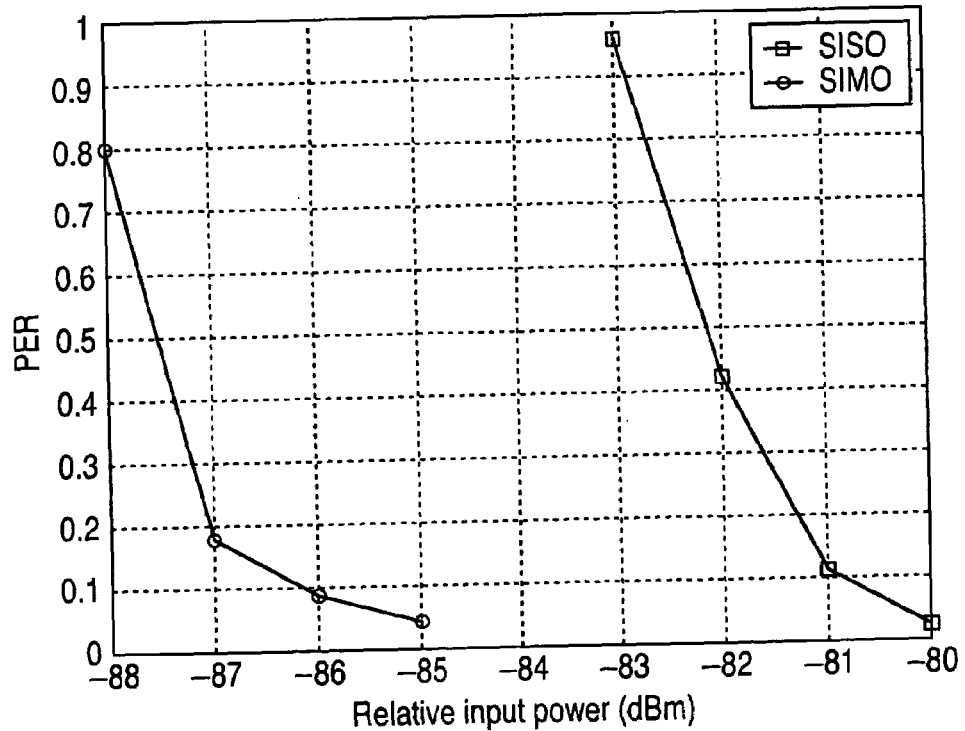
FIG. 11 shows a lab measured AWGN (average white Gaussian noise) PER performance of a 4-antenna SIMO versus a SISO for an IEEE 802.11a/g 16QAM, rate 3/4, 36 Mbps mode averaged over more than 1000 256-byte packets.
Figure 12:
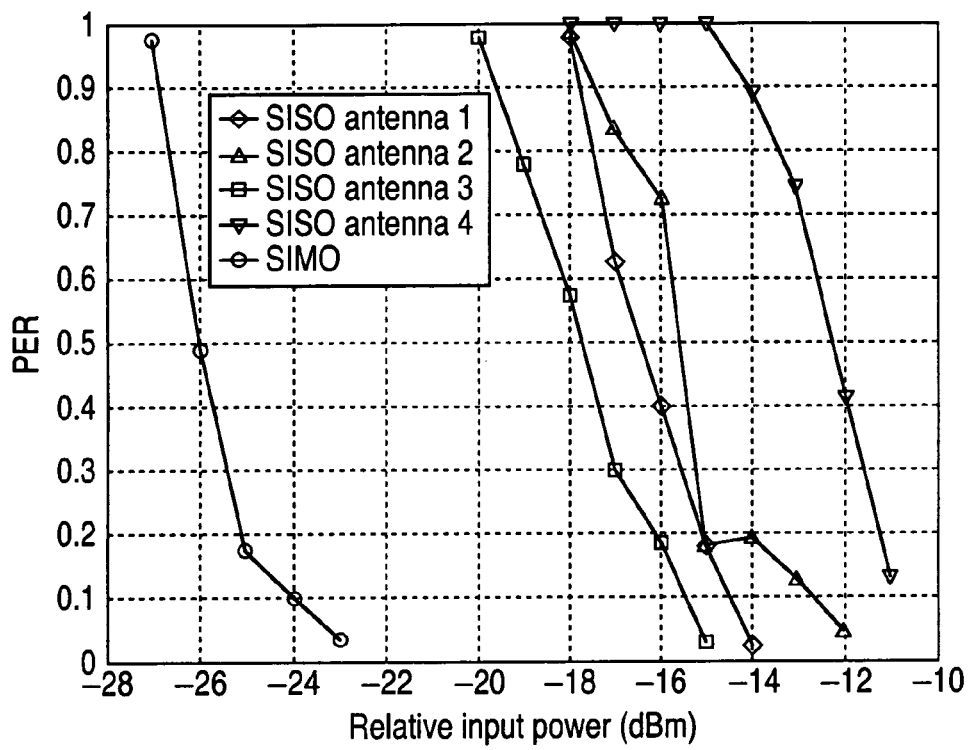
FIG. 12 shows a lab measured over-the-air non-line-of-sight PER performance of a 4-antenna SIMO versus a SISO for an IEEE 802.11a/g 16QAM, rate 3/4, 36 Mbps mode averaged over more than 1000 256-byte packets.

The proposed SIMO/MISO system has been simulated, implemented and tested on real-time hardware. FIGS. 10–12 show the packet error rate (PER) performance results. For both the simulation and lab testing, a 4-antenna SIMO/MISO system was used.

FIG. 10 shows the simulated SIMO/MISO versus SISO performance for an IEEE 802.11a/g 54 Mbps mode with each PER point averaged over 400 runs of 400-byte packet. For multipath simulation, each run uses a different random exponential channel with a RMS (root mean square) delay spread of 100 ns. The simulation proves that for an AWGN channel, the SIMO and MISO have close to 6 dB gain over SISO. For multipath channel, the gain increases to beyond 10 dB.

FIGS. 11 and 12 show lab testing results with the SIMO/MISO system running on real-time hardware connected to 5 GHz RF front-ends. FIG. 11 shows the AWGN performance comparison between SIMO and SISO. In the testing, the transmitter and receiver are connected through a cable. The transmit power is varied while the PER is measured at the receiver. The PER is measured for the IEEE 802.11a/g 36 Mbps mode. Each PER point on the curves are measured over 1000 256-byte packets. The curve shows a 5 dB gain of SIMO versus SISO (1 dB implementation loss from the ideal 6 dB gain). FIG. 11 shows the over-the-air performance comparison between SIMO and SISO. In the testing, there is no line-of-sight between the transmitter and receiver. The performance difference between the 4 SISO antennas is due to different channel frequency responses on the 4 antennas (as illustrated in FIG. 6). The SIMO performance gain over the SISO antennas is between 8 dB and 12 dB.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a single-input-multiple-output/multiple-input-single-output (SIMO/MISO) transceiver for providing packet data communication with a single-input-single-output (SISO) transceiver, comprising:

a plurality of signal terminals for conveying a plurality of incoming radio frequency (RF) signals received via at least a portion of a plurality of spatially diverse antenna elements and corresponding to a wireless data signal originating from a particular SISO RF transceiver, and for conveying a plurality of outgoing RF signals to be transmitted via at least another portion of said plurality of spatially diverse antenna elements for reception by said particular SISO RF transceiver;

receiver circuitry coupled to at least a portion of said plurality of signal terminals and responsive to said plurality of incoming RF signals by providing a corresponding plurality of incoming data signals;

channel estimation circuitry coupled to said receiver circuitry and responsive to said plurality of incoming data signals by providing a plurality of receiver channel gain coefficients, wherein each one of said plurality of receiver channel gain coefficients corresponds to a relative signal strength of a respective one of said plurality of incoming RF signals;

channel profile circuitry coupled to said channel estimation circuitry and responsive to said plurality of receiver channel gain coefficients by providing a related plurality of transmitter channel gain coefficients, wherein each one of said plurality of transmitter channel gain coefficients corresponds to a normalized inverse of a respective one of said plurality of receiver channel gain coefficients;

scaling circuitry coupled to said channel profile circuitry and responsive to said plurality of transmitter channel gain coefficients by scaling one or more outgoing data signals to provide a plurality of related digital data signals; and transmitter circuitry coupled to said scaling circuitry and at least another portion of said plurality of signal terminals, and responsive to said plurality of related digital data signals by providing said plurality of outgoing RF signals.

2. The apparatus of claim 1, wherein said receiver circuitry comprises time domain processing circuitry.

3. The apparatus of claim 2, wherein said time domain processing circuitry comprises Fourier transformation circuitry responsive to a plurality of time domain-based signals related to said plurality of incoming RF signals by providing a plurality of frequency domain-based signals as said plurality of incoming data signals.

4. The apparatus of claim 1, wherein said plurality of incoming data signals comprises a plurality of time domain-based signals.

5. The apparatus of claim 1, wherein said channel estimation circuitry comprises frequency domain processing circuitry.

6. The apparatus of claim 1, wherein:
at least one of said plurality of incoming data signals contains a media access controller (MAC) address associated with said particular SISO RF transceiver; and
said channel profile circuitry comprises
a coefficients computation engine responsive to said plurality of receiver channel gain coefficients by computing a normalized inverse of each one of at least a portion of said plurality of receiver channel gain coefficients to provide said plurality of transmitter channel gain coefficients, and
storage circuitry coupled to said coefficients computation engine and responsive to said plurality of transmitter channel gain coefficients and said particular SISO RF transceiver MAC address by storing said plurality of transmitter channel gain coefficients and said particular SISO RF transceiver MAC address in an associative relationship.

7. The apparatus of claim 1, wherein said transmitter circuitry comprises time domain processing circuitry.

8. The apparatus of claim 7, wherein said time domain processing circuitry comprises inverse Fourier transformation circuitry responsive to a plurality of frequency domain-based signals as said plurality of related digital data signals by providing a plurality of time domain-based signals related to said plurality of outgoing RF signals.

9. The apparatus of claim 1, wherein said plurality of related digital data signals comprises a plurality of frequency domain-based signals.

10. The apparatus of claim 1, wherein at least one of said plurality of incoming data signals contains a media access controller (MAC) address associated with said particular SISO RF transceiver.

11. The apparatus of claim 1, wherein at least one of said one or more outgoing data signals contains a media access controller (MAC) address associated with said particular SISO RF transceiver.

12. An apparatus including a single-input-multiple-output/multiple-input-single-output (SIMO/MISO) transceiver for providing packet data communication with a single-input-single-output (SISO) transceiver, comprising:
signal means for conveying a plurality of incoming radio frequency (RF) signals received via at least a portion of a plurality of spatially diverse antenna elements and corresponding to a wireless data signal originating from a particular SISO RF transceiver, and for conveying a plurality of outgoing RF signals to be transmitted via at least another portion of said plurality of spatially diverse antenna elements for reception by said particular SISO RF transceiver;
receiver means for receiving said plurality of incoming RF signals and in response thereto generating a corresponding plurality of incoming data signals;
channel estimator means for receiving said plurality of incoming data signals and in response thereto generating a plurality of receiver channel gain coefficients, wherein each one of said plurality of receiver channel gain coefficients corresponds to a relative signal strength of a respective one of said plurality of incoming RF signals;
channel profiler means for receiving said plurality of receiver channel gain coefficients and in response thereto generating a related plurality of transmitter channel gain coefficients, wherein each one of said plurality of transmitter channel gain coefficients corresponds to a normalized inverse of a respective one of said plurality of receiver channel gain coefficients;
scaling means for receiving said plurality of transmitter channel gain coefficients and in response thereto scaling one or more outgoing data signals to provide a plurality of related digital data signals; and
transmitter means for receiving said plurality of related digital data signals and in response thereto generating said plurality of outgoing RF signals.

13. A method for providing packet data communication between a single-input-single-output (SISO) transceiver and a single-input-multiple-output/multiple-input-single-output (SIMO/MISO) transceiver, comprising:
conveying a plurality of incoming radio frequency (RF) signals received via at least a portion of a plurality of spatially diverse antenna elements and corresponding to a wireless data signal originating from a particular SISO RF transceiver;
responding to said plurality of incoming RF signals by generating a corresponding plurality of incoming data signals;
responding to said plurality of incoming data signals by generating a plurality of receiver channel gain coefficients, wherein each one of said plurality of receiver channel gain coefficients corresponds to a relative signal strength of a respective one of said plurality of incoming RF signals;
responding to said plurality of receiver channel gain coefficients by generating a related plurality of transmitter channel gain coefficients, wherein each one of said plurality of transmitter channel gain coefficients corresponds to a normalized inverse of a respective one of said plurality of receiver channel gain coefficients;
responding to said plurality of transmitter channel gain coefficients by scaling one or more outgoing data signals to generate a plurality of related digital data signals; and
responding to said plurality of related digital data signals by generating a plurality of outgoing RF signals for transmission via at least another portion of said plurality of spatially diverse antenna elements and reception by said particular SISO RF transceiver.

14. The method of claim 13, wherein said responding to said plurality of incoming RF signals by generating a corresponding plurality of incoming data signals comprises performing one or more Fourier transformations upon a plurality of time domain-based signals related to said plurality of incoming RF signals to generate a plurality of frequency domain-based signals as said plurality of incoming data signals.

15. The apparatus of claim 13, wherein said responding to said plurality of related digital data signals by generating a plurality of outgoing RF signals for transmission via at least another portion of said plurality of spatially diverse antenna elements and reception by said particular SISO RF transceiver comprises performing one or more inverse Fourier transformations upon a plurality of frequency domain-based signals as said plurality of related digital data signals to generate a plurality of time domain-based signals related to said plurality of outgoing RF signals.

16. The apparatus of claim 13, wherein said responding to said plurality of incoming RF signals by generating a corresponding plurality of incoming data signals comprises generating said plurality of incoming data signals such that at least one contains a media access controller (MAC) address associated with said particular SISO RF transceiver.

17. The method of claim 16, wherein said responding to said plurality of receiver channel gain coefficients by generating a related plurality of transmitter channel gain coefficients comprises:
  responding to said plurality of receiver channel gain coefficients by computing a normalized inverse of each one of at least a portion of said plurality of receiver channel gain coefficients to generate said plurality of transmitter channel gain coefficients; and
  responding to said plurality of transmitter channel gain coefficients and said particular SISO RF transceiver MAC address by storing said plurality of transmitter channel gain coefficients and said particular SISO RF transceiver MAC address in an associative relationship.

18. The apparatus of claim 13, wherein said responding to said plurality of transmitter channel gain coefficients by scaling one or more outgoing data signals to generate a plurality of related digital data signals comprises scaling at least one of said one or more outgoing data signals which contains a media access controller (MAC) address associated with said particular SISO RF transceiver.

\* \* \* \* \*